United States Patent Office 2,972,390
Patented Feb. 21, 1961

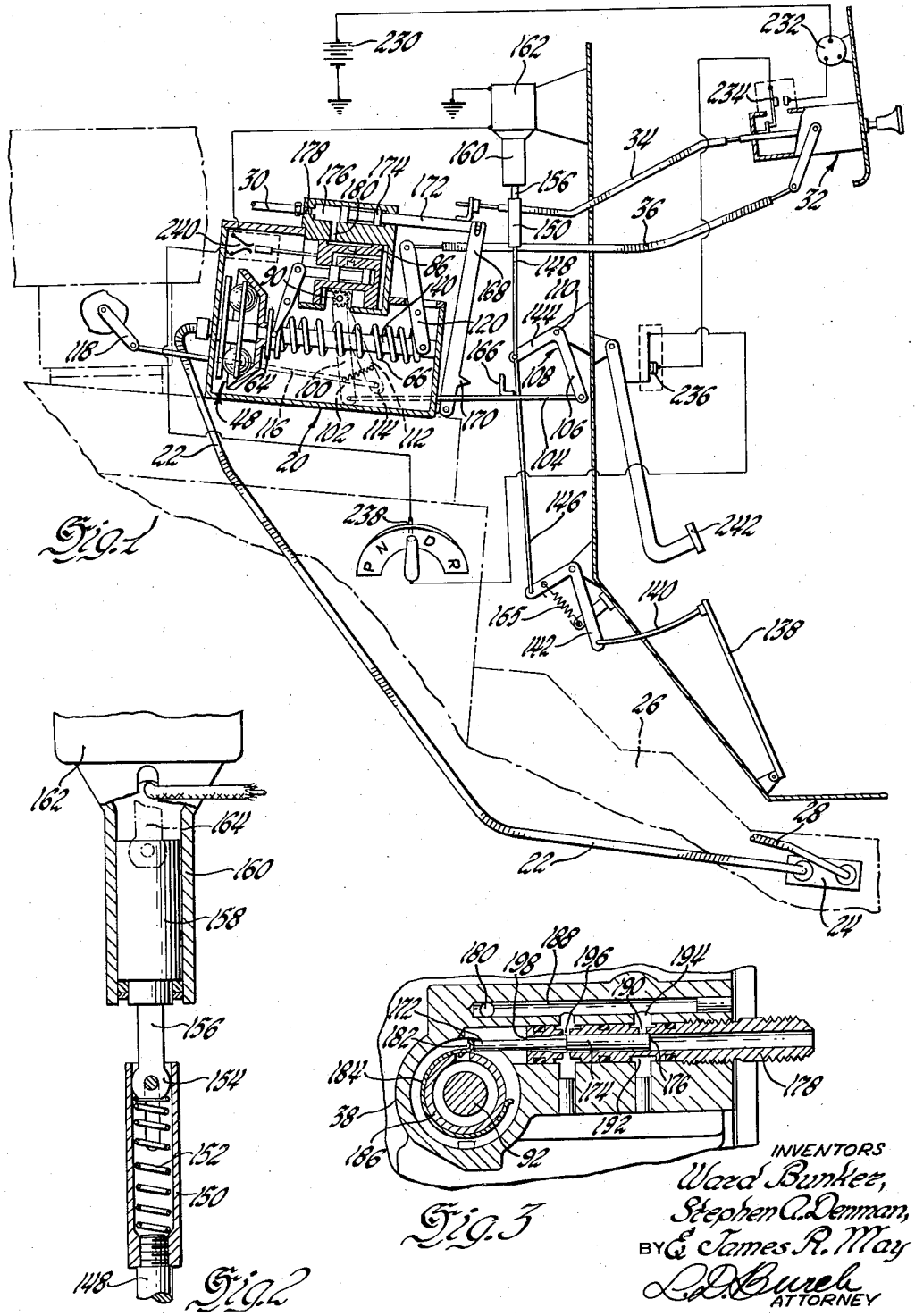

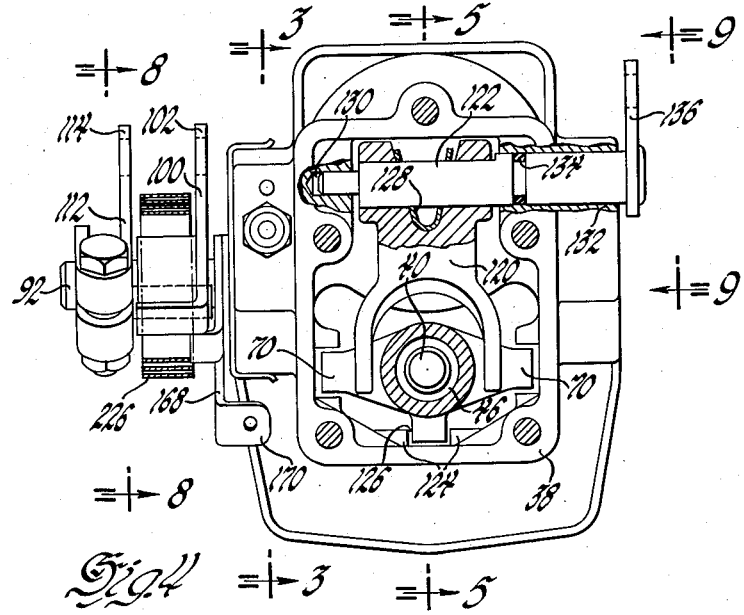
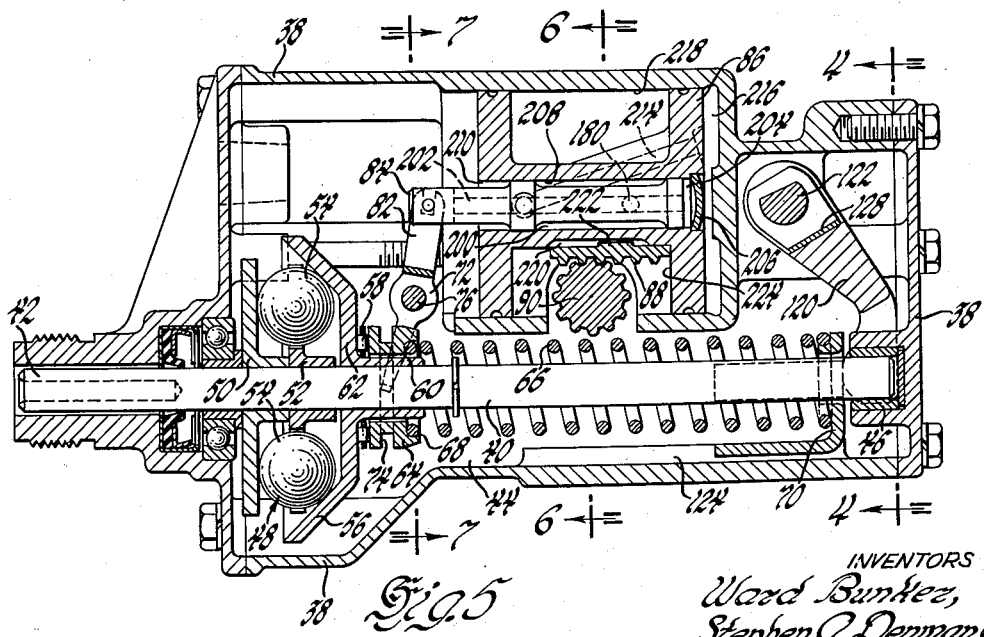

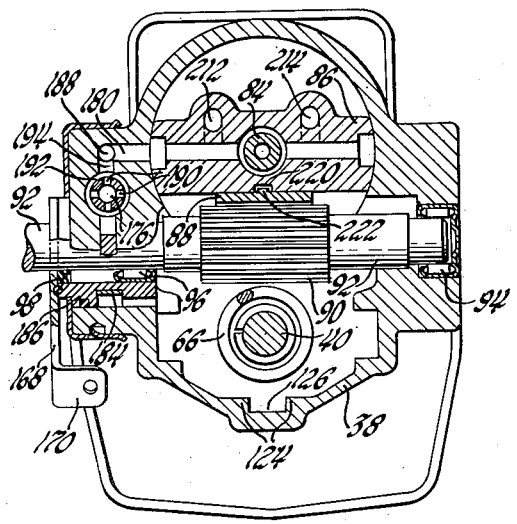
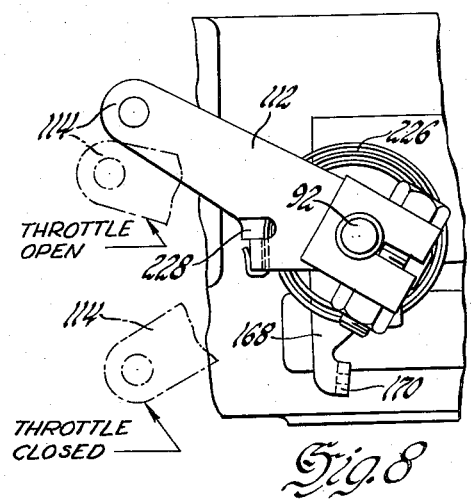
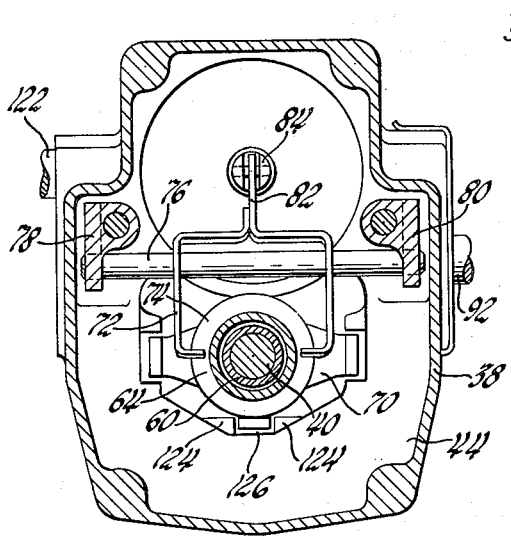
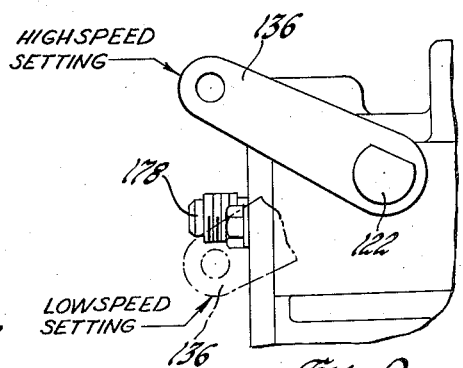

2,972,390

VEHICLE ROAD SPEED CONTROL

Ward Bunker, Dayton, Stephen A. Denman, Piqua, and James R. May, Dayton, Ohio, assignors to General Motors Corporation, Detroit, Mich., a corporation of Delaware Filed Sept. 23, 1957, Ser. No. 685,540

2 Claims. (Cl. 180—82.1)

The invention relates to a road speed control for vehicles powered by internal combustion engines and more particularly to a control which is sensitive to vehicle speed to maintain the vehicle at a predetermined desired cruise speed or to maintain a maximum vehicle speed beyond which the vehicle will not be accelerated under normal conditions. In order to provide such a control which will be acceptable to the general public, it is also necessary to provide overcontrols which may be used in emergencies to either accelerate the vehicle beyond the preset speed or to permit immediate idling conditions of the engine during cruise operations. A feature of the invention includes hydraulic operation of the vehicle throttle during cruise conditions while permitting the throttle to be returned to idle without the necessity of moving the entire mass of the hydraulic actuating system. This feature permits quicker idle return than is otherwise possible.

In the drawings:

Figure 1 is a schematic diagram of a road speed control system embodying the invention;

Figure 2 is a fragmentary view of a portion of the accelerator linkage of Figure 1 with parts broken away and in section;

Figure 3 is a view of a portion of a control taken in the direction of arrows 3—3 of Figure 4;

Figure 4 is a view of the control taken in the direction of arrows 4—4 of Figure 5 with parts broken away and in section;

Figure 5 is a sectional view of the control taken in the direction of arrows 5—5 of Figure 4;

Figure 6 is a sectional view of the control taken in the direction of arrows 6—6 of Figure 5;

Figure 7 is a sectional view of the control taken in the direction of arrows 7—7 of Figure 5;

Figure 8 is a fragmentary view of the control taken in the direction of arrows 8—8 of Figure 4; and Figure 9 is a fragmentary view of the control taken in the direction of arrows 9—9 of Figure 4.

Figure 1 is a schematic diagram of the automatic speed and cruise control system. The control 20 is driven by a flexible drive 22 from the speedometer takeoff adapter 24 which is adapted to be driven by the output shaft of transmission 26. A speedometer drive 28 is also provided on the adapter 24. A hydraulic pressure conduit 30 which provides pressure for use as a power source may be supplied to the control 20 from the lubricating system of the engine, the pressure system of transmission, or other outside sources. A speed adjustment and switch assembly 32 is connected to control 20 mechanically through push-pull cable 34 to set the control 20 in either of the "off," governor "on," or automatic cruise positions as desired. The speed selection cable 36 also connects assembly 32 with control 20.

The control 20 is illustrated in detail in Figures 3 through 9 and includes a control casing 38 through which a shaft 40 projects. One end 42 of shaft 40 is connected to the flexible drive 22 and is driven thereby in direct proportion to the output speed of the transmission which in turn is proportional to the road speed of the vehicle.

Shaft 40 extends through chamber 44 of casing 38 and terminates in a bearing 46 which is positioned in one side of the casing. A flyball governor mechanism 48 is also received within chamber 44. This governor mechanism includes a floating governor disk 50 and a drive spider 52 mounted on shaft 40 and driven thereby. Spider 52 receives governor balls 54 within openings provided for the purpose. A governor cup 56 is provided and formed to restrict the outward movement of the balls 54 within the spider and is slidably movable along the shaft 40 by the outward movement of the balls resulting from centrifugal forces exerted when shaft 40 is rotated.

A thrust bearing 58 is mounted at one end of cup 56 on hub 60. This hub may be integrally formed with governor cup 56. A radially extending portion 62 of the cup acts as one bearing race. The other race is provided by a combination grooved collar and race 64. It is also rotatably mounted on the bearing mounting hub 60. A compression spring 66 abuts at one end against race 64 in a recess 68 formed for that purpose and is received at its opposite end on a spring guide 70 which is mounted for longitudinal movement in a direction parallel to the axis of shaft 40. A yoke 72 may engage the groove 74 of the collar and race 64. This yoke projects radially from an intermediate portion of a transversely disposed shaft 76. Shaft 76 has its ends mounted in casing 38 through lugs 78 and 80 as is best seen in Figure 7. Yoke 72 has an upper end portion forming a lever 82 which is engaged with a projecting end of pilot control valve 84.

Pilot control valve 84 is received within a passage extending through power piston 86. This piston acts as a slave piston and is controlled in its reciprocable movements by valve 84.

A toothed rack 88 is slidably secured to a portion of power piston 86 and is in engaging relationship with pinion 90 which is formed on shaft 92. Shaft 92 is parallel to shaft 76 and is mounted in bearings 94 and 96 in casing 38. Shaft 92 may project exteriorly of the casing through bearing 96 and a seal 98. A bellcrank throttle input lever 100 may be rotatably mounted adjacent the outer end of shaft 92. One end 102 of lever 100 may be pivotally secured to one end of rod 104. The other end of rod 104 may be pivotally secured to arm 106 of bellcrank 108 which may be rotated about its axis 110 through appropriate linkage by the opening and closing movement of the vehicle accelerator pedal.

A second lever 112 is secured to the outer end of shaft 92 beyond lever 100. The end 114 of lever 112 may be connected by rod 116 to the throttle control lever 118 to provide control of the engine throttle by the mechanism.

The speed adjustment setting is made on the control 20 by adjusting the position of spring guide 70 which acts on spring 66 to increase or decrease the compression of that spring. The spring force resisting outward movement of balls 54 is thus adjustable. This adjustment is accomplished through linkage actuated by cable 36 and the speed adjustment and switch assembly 32. Spring adjusting yoke 120 is mounted on shaft 122 and has its free ends engaging spring guide 70 so that when the yoke is pivoted about its shaft, linear movement is imparted to the spring guide. Lands 124 are formed on the inner lower portion of casing 38 and cooperate to form a groove 126 into which a portion of spring guide 70 extends. This groove provides a track along which the spring guide may be moved parallel to the axes of shaft 40 and spring 66. Yoke 120 may be retained on shaft 122 by any suitable means such as retainer 128. One end of shaft 122 may be received within a socket 130 which is formed in one side of casing 38 and the other end of the shaft extends through a journal 132 formed in another side of casing 38 and sealed by oil seal 134. The lever 136 is secured to the outer end of shaft 122 and connected to cable 36 for movement by that cable. Linear movement of cable 36 rotates lever 136, shaft 122, and yoke 120 about the shaft axis and imparts the desired linear movement to spring guide 70.

The throttle linkage which is controlled by the accelerator pedal includes the pedal 138 with a connecting link 140 leading to a crank 142. Crank 142 may be in turn connected to arm 144 of crank lever 108 through link 146. A rod 148 may be connected to arm 144 at the same point at which link 146 is connected to it. A spring retainer 150 is secured to the other end of rod 148 and contains an overtravel spring 152 which abuts the end 154 of a plunger arm 156. Spring 152 has sufficient compression strength to cause movement of arm 156 in the normal range of movement of rod 148. Plunger arm 156 is connected to or integrally formed with a plunger 158 which is reciprocably received within plunger guide 160. The upper end of the plunger guide has a solenoid 162 secured thereto and the plunger 158 may be moved into the solenoid by movement of plunger arm 156. It may be moved into the position of the arm 156 indicated at 164. The plunger is held in this position so long as the solenoid 162 is energized and is retracted by the linkage return spring 165 when the solenoid is deenergized. Overtravel of the actuating rod 148 is permitted by spring 152. Solenoid 162 is sufficiently strong to hold plunger 158 in position only after the plunger is manually moved toward it by actuation of the accelerator pedal linkage. The solenoid is not strong enough to pull the plunger into this position without manual assistance, however. Solenoid 162 holds the accelerator pedal linkage at approximately ¾ throttle position when the plunger 158 is held in its upper position.

As shown schematically in Figure 1, rod 104 has lug 166 mounted thereon which is adapted to engage arm 168 at point 170 when the throttle linkage is moved to or beyond the full throttle position. Arm 168 is connected with the stem 172 of override valve 174 of control 20. This valve is positioned for reciprocable movement within chamber 176 to which inlet 178 leads, as is also shown in Figure 3. Chamber 176 is provided with an outlet passage 180 leading to control valve 84. The illustration in Figure 3 shows a lug 182 which is attached to rotate with clip 184 as that clip is moved by sleeve 186. Sleeve 186 is attached to arm 168 which is in turn attached to cable 34. Lug 170 of arm 168 is engageable with lug 166 on rod 104 for actuation by the accelerator linkage as described above. Lug 182 may engage the stem 172 of valve 174 and move it inwardly to interrupt fluid pressure in conduit 30 before it reaches control valve 84. When override valve 174 is in the position shown schematically in Figure 1, hydraulic pressure is admitted to the control 20. Valve 174 may be moved to the left as shown in that view and will cut off the supply of hydraulic pressure to the control 20 when the valve covers outlet passage 180. The overtravel mechanism adjacent solenoid 162 is provided to permit accelerator pedal operation of the override valve 174 when desired by the operator.

Referring again to Figure 3, the override valve 174 connects inlet 178 with chamber 188 and passage 180 through orifices 190, annular passage 192, and passage 194 when the valve is moving to the left. When valve 174 is moved to the right by lug 182, orifices 190 are closed and orifices 196 are opened to exhaust through axial passage 198. The fluid in chamber 188 is then exhausted into casing 38 and may be returned to the fluid pressure source by any suitable means.

Hydraulic pressure leaving the override valve chamber 188 passes through the supply passage 180 and is received in the annular passage 200 formed by the lands of pilot control valve 84. Valve 84 has an axially extending passage 202 which opens at one end of the valve to chamber 204 formed by the end of valve 84, plug 206 and the pilot control valve passage 208. Passage 202 extends entirely through valve 84 and maintains chamber 204 at exhaust pressure at all times so that the valve may be easily moved within passage 208 without fluid pressure resistance. The end of valve passage 208 terminates at opening 210 which acts as a hydraulic pressure exhaust. When pilot control valve 84 is moved to the left as is shown in Figure 5, passages 212 and 214 are connected with the annular passage 200 which has hydraulic pressure therein. This pressure is transmitted through passages 212 and 214 to pressure chamber 216 formed by power piston 86 and the power cylinder 218 defined by the adjacent portions of casing 38. Power piston 86 then moves to the left, following pilot valve 84. When valve 84 is positioned to the right relative to power piston 86 a sufficient distance to expose passage 212 and 214 to exhaust, a balance condition is obtained within chamber 216. Fluid under pressure flows through passages 212 and 214 from passage 180 into chamber 216. Power piston 86 positions itself so that the pressure in chamber 216 maintains the piston at the desired point by metering the exhaust through passages 212 and 214 and exhaust opening 210.

The lower side of the center portion of power piston 86 is provided with a longitudinal groove 220 and rack 88 is provided with a land 222 cooperating with groove 220 to permit guided longitudinal movement of the rack 88 relative to power piston 86. When the power piston moves to the left toward the idle throttle position as described above, one end of rack 88 engages the inner end wall 224 of the power piston. Rack 88 is then moved to the left with that piston. Since the rack is in toothed engagement with pinion 90, this pinion is rotated counter-clockwise as seen in Figure 5 by the rack movement. Movement of the pinion 90 acts through the throttle linkage including shaft 92, lever 112, rod 116, and throttle control lever 118 to move the engine throttle. Torsion spring 226 is wound up and lever 100 remains stationary. Lug 228 of lever 100 contacts lever 112 when the accelerator pedal is released and returns lever 112 to idle. This lever may be returned to idle because rack 88 is permitted to slide to the left away from piston 86. The floating rack arrangement thus permits the lever 112 to be returned quickly to the closed throttle position by eliminating the necessity of moving the larger mass of power piston 86.

The electrical system schematically illustrated in Figure 1 includes a battery or other electrical source 230 with several control switches in series for safety and control operation. These switches include ignition switch 232, control head switch 234, vehicle brake actuated switch 236, transmission quadrant switch 238, and safety switch 240. Switch 232 is closed when the engine ignition circuit is energized. Switch 234 is closed only when the control head 32 is in the automatic cruise "on" position. Switch 236 is closed at all times when the brake pedal 242 is not depressed. Switch 238 is closed only when the transmission is in drive position. Switch 240 is closed only when power piston 86 is energized to hold the throttle at approximately three-fourths throttle or less.

When all of these switches are closed, solenoid 162 is energized. The accelerator pedal linkage may then be locked at approximately three-fourths throttle after the vehicle has reached its preset cruising speed and the accelerator linkage has been actuated manually to move plunger 158 toward the field of solenoid 162.

Should the operator desire to override the road speed control, he need only move accelerator pedal beyond the three-fourths (¾) throttle position. This will cause lug 166 on rod 104 to engage lever 168 and move valve 174, shutting off the hydraulic pressure which will cause power piston 86 to move to the right, increasing the throttle opening and opening safety switch 240. The additional movement of the rod 148 is taken up by over-travel spring 152. Should the operator desire to disengage the road control to decelerate the vehicle, he need only actuate the brake pedal 242 to open switch 236. Solenoid 162 will then be de-energized, releasing plunger 158 and returning the accelerator pedal linkage to idle. Due to the rack and pinion construction of the throttle power linkage, the engine throttle will be moved to idle without requiring the movement of power piston 86. The operator may also disengage the automatic cruise condition by actuating control head 32 to open switch 234. Should the operator also desire to disengage the maximum speed governing condition, control head 32 may be actuated to move override valve 174 to cut off the fluid pressure supply.

A hydraulically actuated road speed control system has thus been provided which is sensitive to vehicle speed to control either maximum speed of the vehicle or to maintain a vehicle at a preset speed. The system is at all times under the direct control of the vehicle operator.

What is claimed is:

1. A hydraulically actuated servo for controlling a vehicle throttle and manual linkage for controlling said throttle, said servo having a rack slidable relative thereto and engageable therewith at each end of its slidable stroke and a pinion engaging said rack and operatively connected with said throttle, said servo being hydraulically actuated to move said rack in one direction to close said throttle, said throttle being connected with said manual linkage to permit said throttle to be manually closed by said manual linkage with said servo remaining in an open throttle position.

2. A vehicle road speed control system comprising a power throttle control responsive to vehicle speed, a control head connected with said power throttle control for energizing and de-energizing said control and setting said control to a predetermined control condition, and a manual throttle control operable independently of said power throttle control, said power throttle control having a rack mounted thereon and relatively slidable thereto and interconnecting said manual throttle control and said power throttle control and permitting independent manual throttle control of an engine throttle.

References Cited in the file of this patent

UNITED STATES PATENTS

| | | |
|---|---|---|
| 1,822,667 | Proell | Sept. 8, 1931 |
| 2,036,619 | Brown et al. | Apr. 7, 1936 |
| 2,519,859 | Teetor | Aug. 22, 1950 |
| 2,527,352 | Christian | Oct. 24, 1950 |
| 2,708,979 | Reynoldson | May 24, 1955 |
| 2,714,880 | Riley | Aug. 9, 1955 |
| 2,719,517 | Adler | Oct. 4, 1955 |
| 2,755,877 | Kelem | July 24, 1956 |
| 2,816,617 | Lee | Dec. 17, 1957 |
| 2,916,100 | Teetor | Dec. 8, 1959 |